(12) United States Patent
Taylor et al.

(10) Patent No.: US 11,500,579 B1
(45) Date of Patent: Nov. 15, 2022

(54) CONSOLIDATED WRITE SYSTEM AND METHOD

(71) Applicant: EMC IP Holding Company, LLC, Hopkinton, MA (US)

(72) Inventors: Alan L. Taylor, Cary, NC (US); Nagapraveen Veeravenkata Seela, Cary, NC (US); Tarek Haidar, Cary, NC (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 17/239,176

(22) Filed: Apr. 23, 2021

(51) Int. Cl.
*G06F 3/06* (2006.01)

(52) U.S. Cl.
CPC .......... *G06F 3/0655* (2013.01); *G06F 3/0602* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 8,417,871 | B1* | 4/2013 | de la Iglesia | G06F 3/0656 711/114 |
| 8,601,214 | B1* | 12/2013 | Chakalian | G06F 16/172 711/143 |
| 9,703,498 | B1* | 7/2017 | Armangau | G06F 3/065 |
| 10,963,189 | B1* | 3/2021 | Neelakantam | G06F 3/061 |
| 2009/0125681 | A1* | 5/2009 | Makita | G11B 27/36 711/E12.019 |
| 2012/0047332 | A1* | 2/2012 | Bannon | G06F 12/0804 711/135 |
| 2015/0347040 | A1* | 12/2015 | Mathur | G06F 3/0688 711/103 |
| 2016/0034188 | A1* | 2/2016 | Bisht | G06F 3/0655 710/53 |
| 2017/0344605 | A1* | 11/2017 | Wells | G06F 9/5033 |
| 2019/0035473 | A1* | 1/2019 | Rajamani | G06F 3/0679 |
| 2019/0102299 | A1* | 4/2019 | Guim Bernat | G06F 9/5005 |
| 2020/0019330 | A1* | 1/2020 | Brandt | G06F 12/0802 |

* cited by examiner

*Primary Examiner* — Yaima Rigol
(74) *Attorney, Agent, or Firm* — Brian J. Colandreo; Mark H. Whittenberger; Holland & Knight LLP (57) ABSTRACT

A method, computer program product, and computing system for receiving a plurality of discrete write requests on a first computing device until the end of a consolidation window; combining the plurality of discrete write requests received into a consolidated write request; and transmitting the consolidated write request to a second computing device.

21 Claims, 5 Drawing Sheets

CONSOLIDATED WRITE SYSTEM AND METHOD

TECHNICAL FIELD

This disclosure relates to storage management systems and, more particularly, to systems and methods for consolidating write operations within storage management systems.

BACKGROUND

Storing and safeguarding electronic content is of paramount importance in modern business. Accordingly, various methodologies may be employed to protect and distribute such electronic content within storage management systems. During operation of such storage management systems, data may be exchanged between various devices within the storage management system. Unfortunately, a very large quantity of write operations may be executed where each write a very small quantity of data, often resulting in high computational overhead and inefficient utilization of network bandwidth.

SUMMARY OF DISCLOSURE

In one implementation, a computer-implemented method is executed on a computing device and includes: receiving a plurality of discrete write requests on a first computing device until the end of a consolidation window; combining the plurality of discrete write requests received into a consolidated write request; and transmitting the consolidated write request to a second computing device.

One or more of the following features may be included. The first computing device may be a first storage appliance and the second storage device may be a second storage appliance. The consolidated write request may be received on the second computing device. The consolidated write request may be processed to regenerate the plurality of discrete write requests. The plurality of discrete write requests may be executed on the second computing device. Combining the plurality of discrete write requests into a consolidated write request may include: confirming that the quantity of discrete write requests included in the plurality of discrete write requests does not exceed a discrete write request quantity limit. The total number of write requests received on the first computing device during an extended sampling window may be monitored to determine an average write request statistic. The discrete write request quantity limit may be adjusted based, at least in part, upon the average write request statistic. Combining the plurality of discrete write requests into a consolidated write request may include: confirming that the size of the consolidated write request does not exceed a consolidated write request size limit.

In another implementation, a computer program product resides on a computer readable medium and has a plurality of instructions stored on it. When executed by a processor, the instructions cause the processor to perform operations including: receiving a plurality of discrete write requests on a first computing device until the end of a consolidation window; combining the plurality of discrete write requests received into a consolidated write request; and transmitting the consolidated write request to a second computing device.

One or more of the following features may be included. The first computing device may be a first storage appliance and the second storage device may be a second storage appliance. The consolidated write request may be received on the second computing device. The consolidated write request may be processed to regenerate the plurality of discrete write requests. The plurality of discrete write requests may be executed on the second computing device. Combining the plurality of discrete write requests into a consolidated write request may include: confirming that the quantity of discrete write requests included in the plurality of discrete write requests does not exceed a discrete write request quantity limit. The total number of write requests received on the first computing device during an extended sampling window may be monitored to determine an average write request statistic. The discrete write request quantity limit may be adjusted based, at least in part, upon the average write request statistic. Combining the plurality of discrete write requests into a consolidated write request may include: confirming that the size of the consolidated write request does not exceed a consolidated write request size limit.

In another implementation, a computing system includes a processor and memory is configured to perform operations including: receiving a plurality of discrete write requests on a first computing device until the end of a consolidation window; combining the plurality of discrete write requests received into a consolidated write request; and transmitting the consolidated write request to a second computing device.

One or more of the following features may be included. The first computing device may be a first storage appliance and the second storage device may be a second storage appliance. The consolidated write request may be received on the second computing device. The consolidated write request may be processed to regenerate the plurality of discrete write requests. The plurality of discrete write requests may be executed on the second computing device. Combining the plurality of discrete write requests into a consolidated write request may include: confirming that the quantity of discrete write requests included in the plurality of discrete write requests does not exceed a discrete write request quantity limit. The total number of write requests received on the first computing device during an extended sampling window may be monitored to determine an average write request statistic. The discrete write request quantity limit may be adjusted based, at least in part, upon the average write request statistic. Combining the plurality of discrete write requests into a consolidated write request may include: confirming that the size of the consolidated write request does not exceed a consolidated write request size limit.

The details of one or more implementations are set forth in the accompanying drawings and the description below. Other features and advantages will become apparent from the description, the drawings, and the claims.

DETAILED DESCRIPTION OF THE PREFERRED EMBODIMENTS

Figure 1:
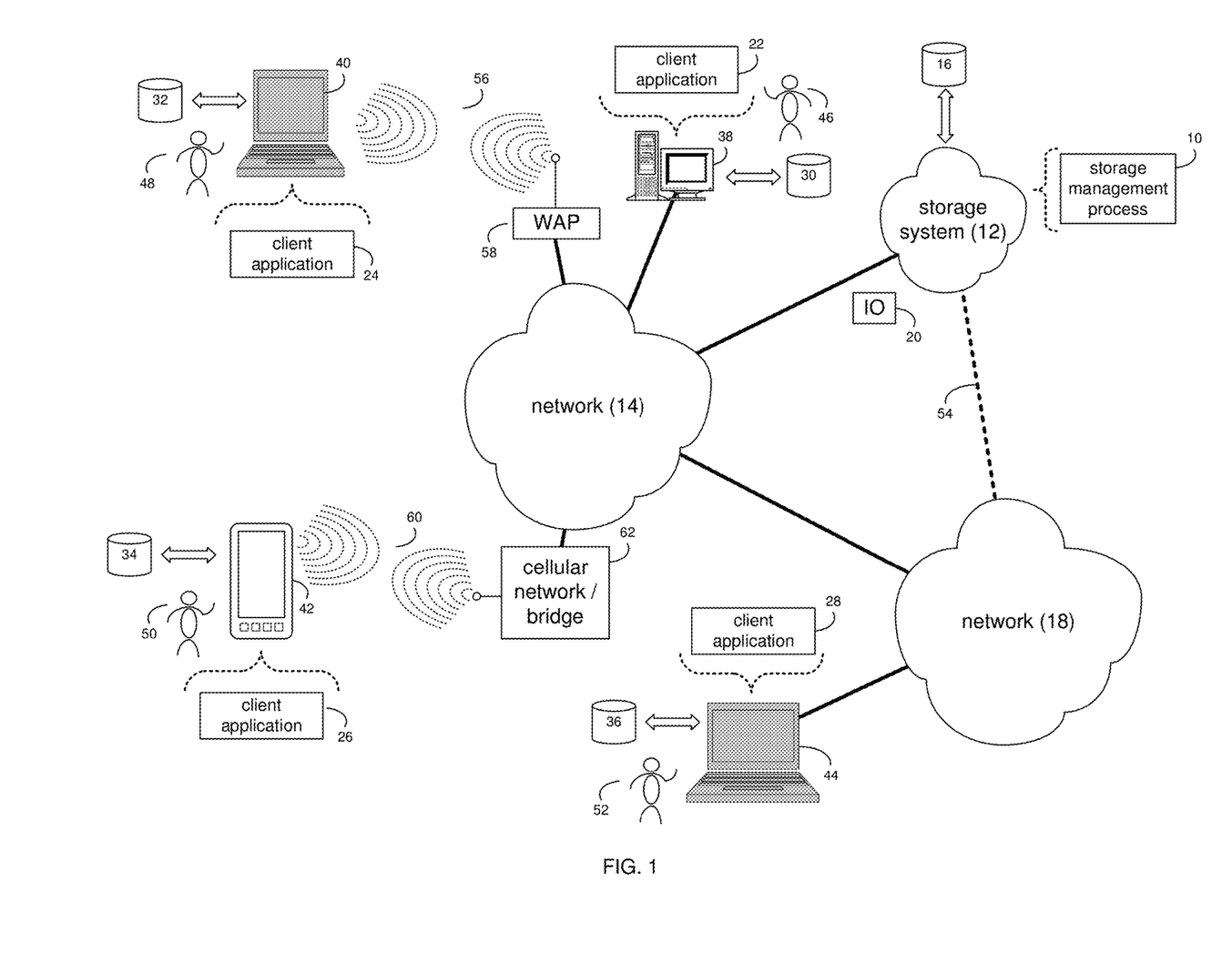
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a personal computer with a memory system, a server computer with a memory system, a Network Attached Storage (NAS) system, a storage appliance, a Storage Area Network (SAN) and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 coupled to storage system 12, may be executed by one or more processors (not shown) and one or more memory architectures (not shown) included within storage system 12. Storage device 16 may include but is not limited to: a hard disk drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

Figure 2:
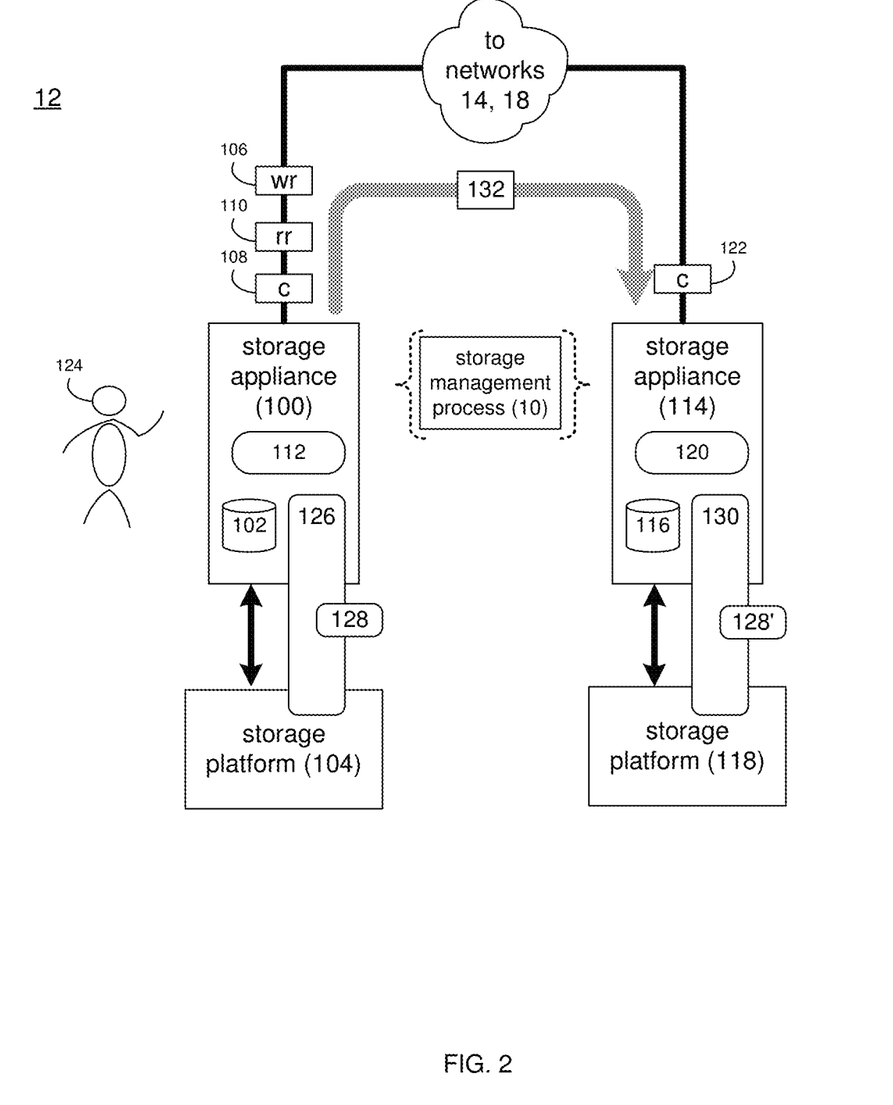
FIG. 2 is a diagrammatic view of the storage system of FIG. 1.

The Data Storage System:

Referring also to FIG. 2, there is shown a general implementation of storage system 12. In this general implementation, storage system 12 may include first storage appliance 100. As is known in the art, a storage appliance is a type of computing device that provides data to (or manages data for) other network-connected computing devices. Such storage appliances may be multi-node storage appliances that provide a high level of availability, in that one node within the storage appliance may continue to operate even after the failure of another node within the storage appliance. First storage appliance 100 may be configured to perform computational tasks and may be configured to store data locally (on local storage 102) or within storage platform 104.

Depending upon the manner in which storage system 12 is configured, storage platform 104 may include a single storage device (such as a single hard disk drive or a single solid state storage device) or may include a plurality of storage devices that are configured to provide various levels of performance and/or high availability. For example and if storage platform 104 includes a plurality of storage devices (e.g., hard disk drives and/or solid state storage devices), this plurality of storage devices may be configured to form a RAID storage array utilizing various standard RAID structures (e.g., RAID 0, RAID 1, RAID 3, RAID 5, RAID 6, RAID 7 or RAID 10), thus providing a higher level of performance and/or availability.

Storage system 12 may be configured to execute all or a portion of storage management process 10. The instruction sets and subroutines of storage management process 10, which may be stored on a storage device (e.g., storage device 102) coupled to e.g., first storage appliance 100, may be executed by one or more processors (not shown) and one or more memory architectures (not shown) included within first storage appliance 100. Storage device 102 may include but is not limited to: a hard disk drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage system 12 is configured as an application server, these IO requests may be internally generated within storage system 12. Examples of IO request 20 may include but are not limited to data write request 106 (i.e. a request that content 108 be written to storage system 12) and data read request 110 (i.e. a request that content 108 be read from storage system 12).

During operation of first storage appliance 100, content 108 to be written to storage system 12 may be processed by first storage appliance 100. Additionally/alternatively and when storage system 12 is configured as an application server, content 108 to be written to storage system 12 may be internally generated by first storage appliance 100.

First storage appliance 100 may include cache memory system 112. Examples of cache memory system 112 may include but are not limited to a volatile, solid-state, cache memory system (e.g., a static RAM cache memory system) and/or a non-volatile, solid-state, cache memory system (e.g., a flash-based, cache memory system). First storage appliance 100 may initially store content 108 within cache memory system 112. Depending upon the manner in which cache memory system 112 is configured, first storage appliance 100 may immediately write content 108 to local storage 102 or storage platform 104 (if cache memory system 112 is configured as a write-through cache) or may subsequently write content 108 to local storage 102 or storage platform 104 (if cache memory system 112 is configured as a write-back cache).

Storage system 12 may be configured to include a plurality of storage appliances, each of which may be configured to receive, generate and/or process content. For example and in addition to first storage appliance 100, storage system 12 may include one or more additional storage appliances (e.g., second storage appliance 114). Second storage appliance 114 may be configured to perform computational tasks and may be configured to store data locally (on local storage 116) or within storage platform 118.

Second storage appliance 114 may include cache memory system 120. Examples of cache memory system 120 may include but are not limited to a volatile, solid-state, cache memory system (e.g., a static RAM cache memory system) and/or a non-volatile, solid-state, cache memory system (e.g., a flash-based, cache memory system). Second storage appliance 114 may initially store content 122 within cache memory system 120. Depending upon the manner in which cache memory system 120 is configured, second storage appliance 114 may immediately write content 122 to local storage 116 or storage platform 118 (if cache memory system 120 is configured as a write-through cache) or may subsequently write content 122 to local storage 116 or storage platform 118 (if cache memory system 120 is configured as a write-back cache).

Storage Management Process:

As discussed above, various IO requests (e.g. TO request 20) may be generated, wherein these IO requests may be sent from client applications 22, 24, 26, 28 to storage system 12. Additionally/alternatively and when storage system 12 is configured as an application server, these IO requests may be internally generated within storage system 12. Examples of IO request 20 may include but are not limited to data write request 106 (i.e. a request that content 108 be written to storage system 12) and data read request 110 (i.e. a request that content 108 be read from storage system 12).

As discussed above, storage system 12 may be configured to include a plurality of storage appliances (e.g., storage appliances 100, 114), wherein each of these storage appliances (e.g., storage appliances 100, 114) may be configured to receive, generate and/or process content. Accordingly and when storage system 12 includes a plurality of storage appliances (e.g., storage appliances 100, 114), storage system 12 may provide a high level of availability.

During use of storage system 12, a user (e.g., user 124) may define one or more volumes. As is known in the art, a volume (i.e., logical drive) is a single accessible storage area with a single file system, typically (though not necessarily) resident on a single partition of a hard disk. Although a volume might be different from a physical disk drive, it may still be accessed with an operating system's logical interface.

For example, user 124 may define volume 126 within storage appliance 100 for storing data (e.g., data 128) within storage appliance 100. As discussed above and when storing data (e.g., data 128) within storage appliance 100, this data (e.g., data 128) may be stored locally within storage appliance 100 or remotely within storage platform 104. Accordingly and when defining volume 126 within storage platform 100, volume 126 may be exclusively a local volume (i.e., only on storage appliance 100), may be exclusively a remote volume (i.e., only on storage platform 104) or may be a hybrid volume (i.e., spread across storage appliance 100 and storage platform 104).

In order to provide a high level of availability, volume 126 may be replicated to e.g., second storage appliance 114. For example, second storage appliance 114 may be located within a different department, within a different building, or within a different geographic region than first storage appliance 100. Accordingly, user 124 may define volume 130 within storage appliance 114 for storing a copy of data (e.g., data 128') within storage appliance 114. As discussed above and when storing data (e.g., data 128') within storage appliance 114, this data (e.g., data 128') may be stored locally within storage appliance 114 or remotely within storage platform 118. Accordingly and when defining volume 130 within storage platform 114, volume 130 may be exclusively a local volume (i.e., only on storage appliance 114), may be exclusively a remote volume (i.e., only on storage platform 118) or may be a hybrid volume (i.e., spread across storage appliance 114 and storage platform 118).

As is known in the art, when replicating data between two locations (e.g., from volume 126 within storage appliance 100 to volume 130 within storage appliance 114), data may be replicated in real time or in accordance with a replication schedule. For example and when replicating in real time, the replication functionality may always be running and when data (e.g., data 128) is written to e.g., volume 126 within storage appliance 100, shortly thereafter (typically within milliseconds), a copy of that data (e.g., data 128') may be written to volume 130 within storage appliance 114. Alternatively and when using a replication schedule, new data (e.g., data 128) on volume 126 within storage appliance 100 may be subsequently copied to volume 130 within storage appliance 114 at defined intervals (e.g., every 30 minutes, every 3 hours, or every 24 hours).

As could be imagined, replication from storage appliance 100 to storage appliance 114 may result in the generation of a significant number of write requests (e.g., write request 132) being generated by storage appliance 100 and provided to storage appliance 114 for processing. Accordingly and as will be discussed below in greater detail, storage management process 10 may combine a plurality of discrete write requests generated by storage appliance 100 to form a consolidated write request that may be provided to storage appliance 114 for processing.

Figure 3:
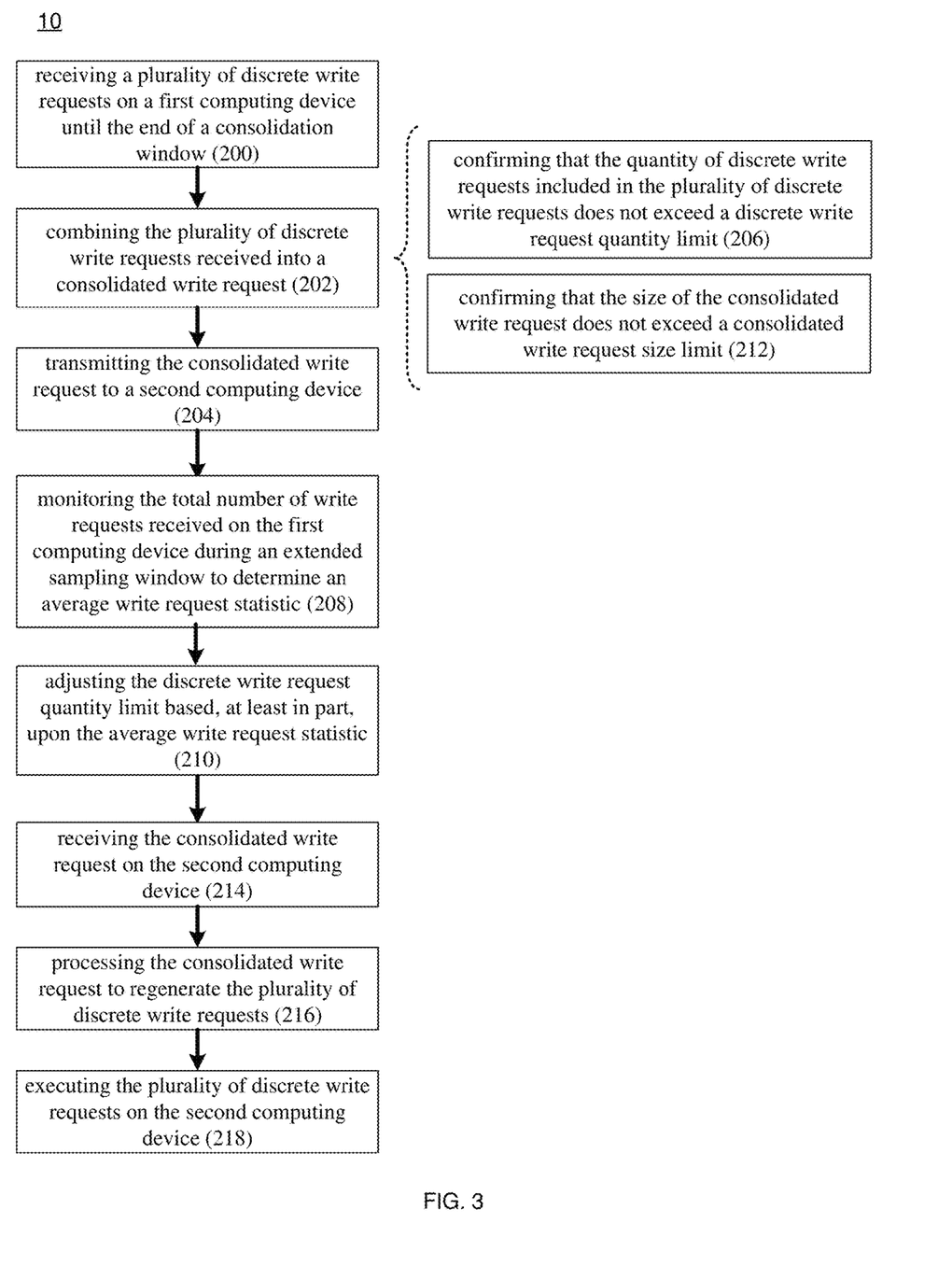
FIG. 3 is a flow chart of the storage management process of FIG. 1.
Figure 4:
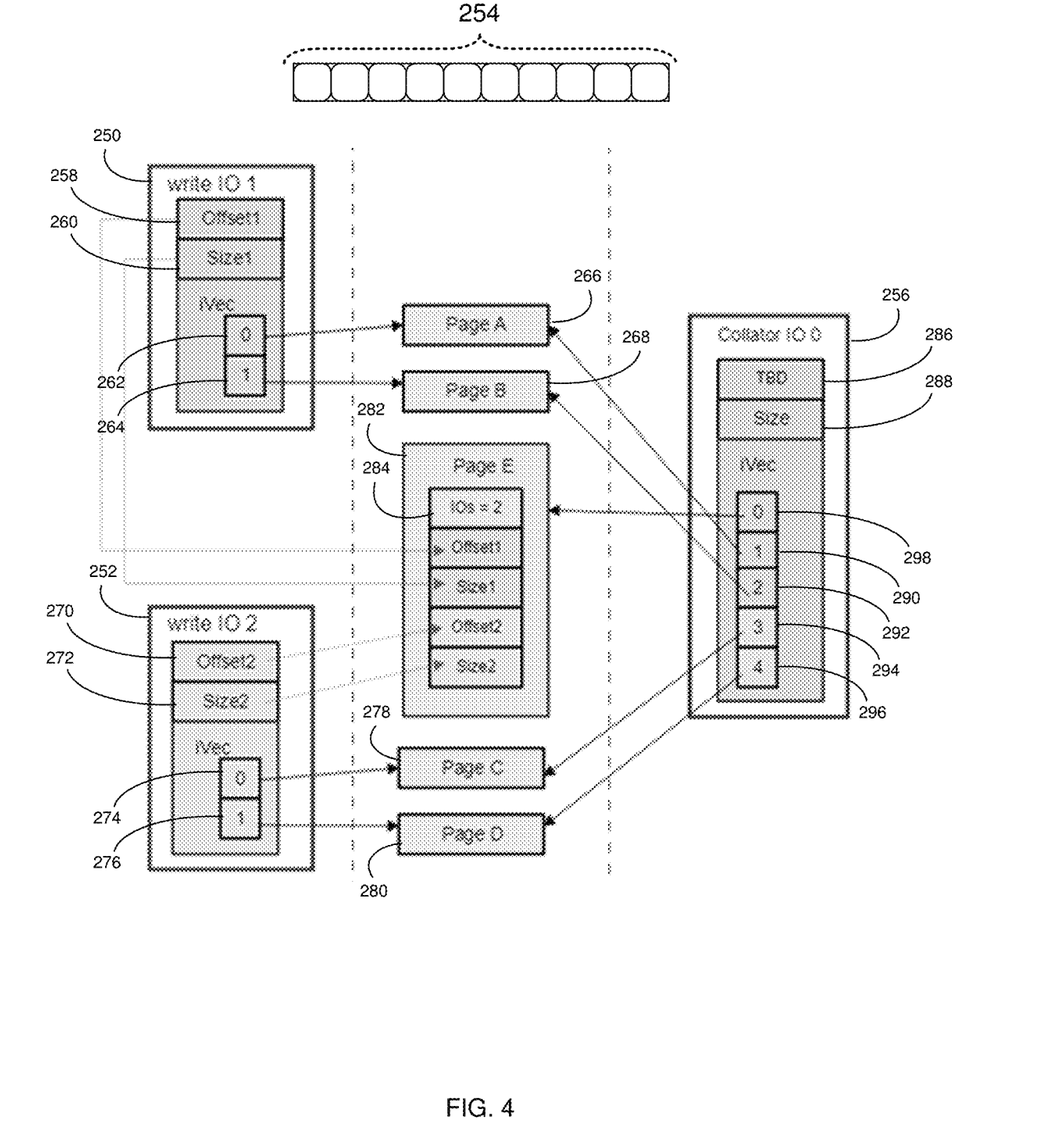
FIG. 4 is a diagrammatic view of a consolidation process performed by the storage management process of FIG. 3.

Referring also to FIGS. 3-4, storage management process 10 may receive 200 a plurality of discrete write requests (e.g., discrete write requests 250, 252) on a first computing device (e.g., storage appliance 100) until the end of a consolidation window (e.g., consolidation window 254). This consolidation window (e.g., consolidation window 254) may be a finite period of time (e.g., 10 milliseconds), wherein the length of consolidation window 254 may be tuned to balance network bandwidth utilization and user delay. As could be imagined, as consolidation window 254 gets longer, the bandwidth utilization of e.g. network 14, 18 may be increased (which is good) while the delay experienced by users (e.g., users 46, 48, 50, 52) may also be increased (which is bad). Conversely, as consolidation window 254 gets shorter, the bandwidth utilization of network 14, 18 may be decreased (which is bad) while the delay experienced by users (e.g., users 46, 48, 50, 52) may also be decreased (which is good). Accordingly, consolidation window 254 having a length of 10 milliseconds is for illustrative purposes only and is not intended to be a limitation of this disclosure, as the length of consolidation window 254 may be increased or decreased depending upon desired performance criteria.

Storage management process 10 may combine 202 the plurality of discrete write requests (e.g., discrete write requests 250, 252) received (e.g., during consolidation window 254) into a consolidated write request (e.g., consolidated write request 256).

As is known in the art, each of the plurality of discrete write requests (e.g., discrete write requests 250, 252) may define various pieces of information (e.g., size, offset and location). For example, discrete write request 250 is shown to include offset indicator 258, size indicator 260, and one or more pointers (e.g., pointers 262, 264) that point to memory pages (e.g., memory pages 266, 268) associated with the content that is the subject of write request 250. Further, discrete write request 252 is shown to include offset indicator 270, size indicator 272, and one or more pointers (e.g., pointers 274, 276) that point to memory pages (e.g., memory pages 278, 280) associated with the content that is the subject of write request 252.

When storage management process 10 combines 202 the plurality of discrete write requests (e.g., discrete write requests 250, 252) received (e.g., during consolidation window 254) into a consolidated write request (e.g., consolidated write request 256), storage management process 10 may generate a new memory page (e.g., memory page 282), wherein memory page 282 may define the various pieces of information (e.g., size, offset and location) of the write requests included within consolidated write request 256. For example, memory page 282 may define offset indicator 258 & size indicator 260 (for discrete write request 250) and offset indicator 270 & size indicator 272 (for discrete write request 252). Further, memory page 282 may include quantity indicator 284 that defines the quantity of write requests included within consolidated write request 256 (which, in the example, is two).

Consolidated write request 256 may define various pieces of information (e.g., size, offset and location). For example, consolidated write request 256 is shown to include offset indicator 286, size indicator 288, and one or more pointers (e.g., pointers 290, 292, 294, 296, 298). Offset indicator 286 may be the offset associated with the first write request (e.g., discrete write request 250) included within consolidated write request 256. Size indicator 288 may be the combined size of all of the memory pages associated with write requests 250, 252 (namely memory pages 266, 268, 278, 280). Pointers 290, 292 may point to memory pages 266, 268 (the memory pages associated with discrete write request 250) and pointers 294, 296 may point to memory pages 278, 280 (the memory pages associated with discrete write request 252). Additionally, pointer 298 may point to memory page 282 that defines offset indicator 258 & size indicator 260 (for discrete write request 250), offset indicator 270 & size indicator 272 (for discrete write request 252), and quantity indicator 284.

Storage management process 10 may transmit 204 the consolidated write request (e.g., consolidated write request 256) to a second computing device (e.g., storage appliance 114) for processing.

When combining 202 the plurality of discrete write requests (e.g., discrete write requests 250, 252) into a consolidated write request (e.g., consolidated write request 256), storage management process 10 may confirm 206 that the quantity of discrete write requests (e.g., in this example, two) included in the plurality of discrete write requests (e.g., discrete write requests 250, 252) does not exceed a discrete write request quantity limit. The discrete write request quantity limit may be set to provide a balance between performance enhancement and acceptable delay (in a fashion similar to defining the length of consolidation window 254). For example, increasing the discrete write request quantity limit may result in a larger quantity of data being included within a single consolidated write request, which is good as it enhances network bandwidth utilization. However, the processing of larger consolidated write requests may result in unacceptable user delays and/or processor congestion (which is bad). A typical value for the discrete write request quantity limit may be eight, wherein a maximum of eight discrete write requests may be combined to form consolidated write request 256. Accordingly and once e.g., eight discrete write requests are received within consolidation window 254, consolidated write request 256 may be transmitted 204 to the second computing device (e.g., storage appliance 114) regardless of whether consolidation window 254 has expired yet, thus preventing the assemblage of a consolidated write request that is overly large and burdensome to process.

While the discrete write request quantity limit is discussed above as being set to eight, this value need not be static and may be dynamically adjusted based upon the operation of storage system 12. Accordingly, storage management process 10 may monitor 208 the total number of write requests received on the first computing device (e.g., storage appliance 100) during an extended sampling window to determine an average write request statistic. For example, storage management process 10 may monitor 208 the total number of write requests received on storage appliance 100 during e.g., a one second interval (which includes one-hundred 10 millisecond consolidation windows). For this example, assume that during such a one second sampling window, six-hundred write requests were received, resulting in an average write request statistic of 6 write requests being received per 10 millisecond consolidation window.

Once the average write request statistic is determined, storage management process 10 may adjust 210 the discrete write request quantity limit (currently set to 8) based, at least in part, upon the average write request statistic (which was calculated in this example to be 6). Ideally, the write request quantity limit (currently set to 8) should be set low enough so that consolidation window 254 never expires (i.e., the write request quantity limit is typically hit before consolidation window 254 expires). Accordingly and in light of the average write request statistic being 6 in this example, storage management process 10 may adjust 210 discrete write request quantity limit downward from 8 to 6, thus increasing the likelihood of the write request quantity limit being hit before consolidation window 254 expires.

When combining 202 the plurality of discrete write requests (e.g., discrete write requests 250, 252) into a consolidated write request (e.g., consolidated write request 256), storage management process 10 may confirm 212 that the size of the consolidated write request (e.g., consolidated write request 256) does not exceed a consolidated write request size limit. Generally speaking, if the size of consolidated write request 256 gets too large, the processing of consolidated write request 256 may become overly burdensome for e.g., networks 14, 18 and/or storage appliance 114. Accordingly, storage management process 10 may define a consolidated write request size limit of e.g., 512k. Accordingly and as storage management process 10 is combining 202 discrete write requests (e.g., discrete write requests 250, 252) into a consolidated write request (e.g., consolidated write request 256), in the event that adding an additional discrete write request to consolidated write request 256 will result in consolidated write request 256 being larger than (in this example) 512k, storage management process 10 may not add the additional discrete write request (even if the discrete write request quantity limit was not yet hit).

As discussed above, storage management process 10 may transmit 204 the consolidated write request (e.g., consolidated write request 256) to a second computing device (e.g., storage appliance 114) for processing.

Accordingly, storage management process 10 may receive 214 the consolidated write request (e.g., consolidated write request 256) on the second computing device (e.g., storage appliance 114), wherein storage management process 10 may process 216 the consolidated write request (e.g., consolidated write request 256) to regenerate the plurality of discrete write requests (e.g., discrete write requests 250, 252) and execute 218 the plurality of discrete write requests (e.g., discrete write requests 250, 252) on the second computing device (e.g., storage appliance 114).

Figure 5:
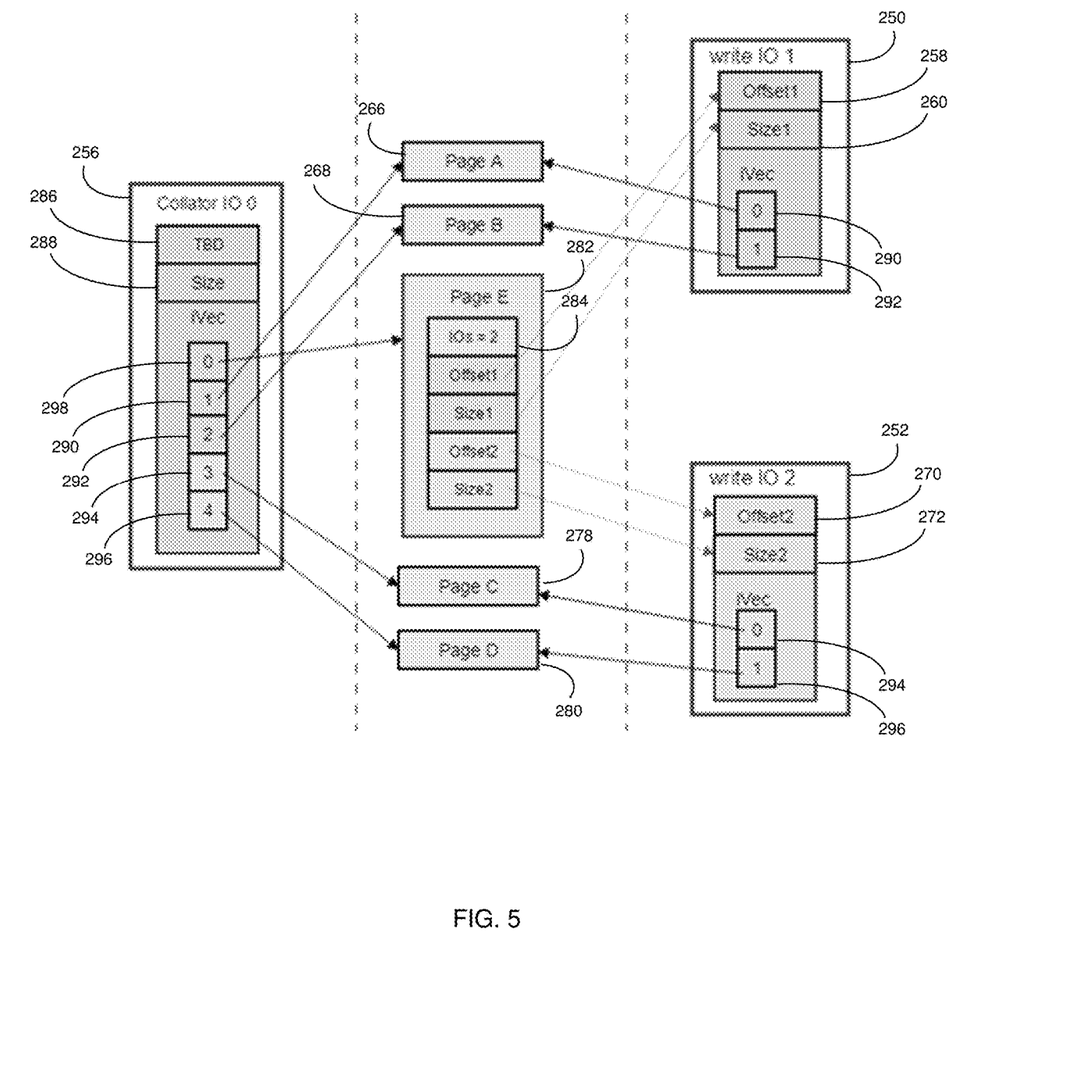
FIG. 5 is a diagrammatic view of a regeneration process performed by the storage management process of FIG. 3.

For example and referring also to FIG. 5, storage management process 10 may receive 214 consolidated write request 256 on storage appliance 114. Storage management process 10 may then process 216 consolidated write request 256 to extract from consolidated write request 256 all of the information needed to regenerate (in this example) discrete write requests 250, 252. As discussed above, consolidated write request 256 may define various pieces of information (e.g., size, offset and location). For example, consolidated write request 256 is shown to include offset indicator 286, size indicator 288, and one or more pointers (e.g., pointers 290, 292, 294, 296, 298), wherein pointers 290, 292 may point to memory pages 266, 268 (the memory pages associated with discrete write request 250) and pointers 294, 296 may point to memory pages 278, 280 (the memory pages associated with discrete write request 252). Further, pointer 298 may point to memory page 282 that defines offset indicator 258 & size indicator 260 (for discrete write request 250), offset indicator 270 & size indicator 272 (for discrete write request 252), and quantity indicator 284.

Accordingly and when storage management process 10 processes 216 consolidated write request 256 to regenerate discrete write request 250, storage management process 10 may regenerate discrete write request 250 by combining offset indicator 258 (associated with discrete write request 250), size indicator 260 (associated with discrete write request 250), and pointers 290, 292 (i.e., the pointers that point to memory pages 266, 268 (i.e., the memory pages associated with discrete write request 250), wherein discrete write request 250 (once regenerated) may be executed 218 on storage appliance 114.

Further and when storage management process 10 processes 216 consolidated write request 256 to regenerate discrete write request 252, storage management process 10 may regenerate discrete write request 252 by combining offset indicator 270 (associated with discrete write request 252), size indicator 272 (associated with discrete write request 252), and pointers 294, 296 (i.e., the pointers that point to memory pages 278, 280 (i.e., the memory pages associated with discrete write request 252), wherein discrete write request 252 (once regenerated) may be executed 218 on storage appliance 114.

Accordingly, storage management process 10 may be configured to consolidate requests to enable the synchronization of data between two storage appliances (e.g., storage appliance 100 & storage appliance 114). For example, when a replication relationship is first established, storage management process 10 may synchronize the data between the two storage appliances (e.g., storage appliance 100 & storage appliance 114). During such a synchronization event, storage management process 10 may consolidate such requests, which may happen in the background and outside of the context of the users (e.g., users 46, 48, 50, 52). Further and in the event of a communication failure between the two storage appliances (e.g., storage appliance 100 & storage appliance 114), storage management process 10 may resynchronize the remote destination once communication is reestablished.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   receiving a plurality of discrete write requests on a first computing device until a first occurrence of at least the end of a consolidation window and the plurality of discrete write requests received equals a discrete write request quantity limit;
   combining the plurality of discrete write requests received into a consolidated write request;
   transmitting the consolidated write request to a second computing device;
   monitoring a total number of write requests received on the first computing device during an extended sampling window; and
   dynamically adjusting the discrete write request quantity limit based on at least a comparison between the plurality of discrete write requests combined due to the discrete write request quantity limit in the total number of write requests compared to the plurality of discrete write requests combined due to the end of the consolidation window in the total number of write requests.

2. The computer-implemented method of claim 1 wherein the first computing device is a first storage appliance and the second storage device is a second storage appliance.

3. The computer-implemented method of claim 1 further comprising:
   receiving the consolidated write request on the second computing device;
   processing the consolidated write request to regenerate the plurality of discrete write requests; and executing the plurality of discrete write requests on the second computing device.

4. The computer-implemented method of claim 1 wherein combining the plurality of discrete write requests into a consolidated write request includes:
confirming that the quantity of discrete write requests included in the plurality of discrete write requests does not exceed a discrete write request quantity limit.

5. The computer-implemented method of claim 4 wherein monitoring the total number of write requests received on the first computing device during an extended sampling window includes determining an average write request statistic.

6. The computer-implemented method of claim 5 further comprising:
adjusting the discrete write request quantity limit based, at least in part, upon the average write request statistic.

7. The computer-implemented method of claim 1 wherein combining the plurality of discrete write requests into a consolidated write request includes:
confirming that the size of the consolidated write request does not exceed a consolidated write request size limit.

8. A computer program product residing on a non-transitory computer readable medium having a plurality of instructions stored thereon which, when executed by a processor, cause the processor to perform operations comprising:
receiving a plurality of discrete write requests on a first computing device until a first occurrence of at least the end of a consolidation window and the plurality of discrete write requests received equals a discrete write request quantity limit;
combining the plurality of discrete write requests received into a consolidated write request;
transmitting the consolidated write request to a second computing device;
monitoring a total number of write requests received on the first computing device during an extended sampling window; and
dynamically adjusting the discrete write request quantity limit based on at least a comparison between the plurality of discrete write requests combined due to the discrete write request quantity limit in the total number of write requests compared to the plurality of discrete write requests combined due to the end of the consolidation window in the total number of write requests.

9. The computer program product of claim 8 wherein the first computing device is a first storage appliance and the second storage device is a second storage appliance.

10. The computer program product of claim 8 further comprising:
receiving the consolidated write request on the second computing device;
processing the consolidated write request to regenerate the plurality of discrete write requests; and
executing the plurality of discrete write requests on the second computing device.

11. The computer program product of claim 8 wherein combining the plurality of discrete write requests into a consolidated write request includes:
confirming that the quantity of discrete write requests included in the plurality of discrete write requests does not exceed a discrete write request quantity limit.

12. The computer program product of claim 11 wherein monitoring the total number of write requests received on the first computing device during an extended sampling window includes determining an average write request statistic.

13. The computer program product of claim 12 further comprising:
adjusting the discrete write request quantity limit based, at least in part, upon the average write request statistic.

14. The computer program product of claim 8 wherein combining the plurality of discrete write requests into a consolidated write request includes:
confirming that the size of the consolidated write request does not exceed a consolidated write request size limit.

15. A computing system including a processor and memory configured to perform operations comprising:
receiving a plurality of discrete write requests on a first computing device until a first occurrence of at least the end of a consolidation window and the plurality of discrete write requests received equals a discrete write request quantity limit;
combining the plurality of discrete write requests received into a consolidated write request;
transmitting the consolidated write request to a second computing device;
monitoring a total number of write requests received on the first computing device during an extended sampling window; and
dynamically adjusting the discrete write request quantity limit based on at least a comparison between the plurality of discrete write requests combined due to the discrete write request quantity limit in the total number of write requests compared to the plurality of discrete write requests combined due to the end of the consolidation window in the total number of write requests.

16. The computing system of claim 15 wherein the first computing device is a first storage appliance and the second storage device is a second storage appliance.

17. The computing system of claim 15 further comprising:
receiving the consolidated write request on the second computing device;
processing the consolidated write request to regenerate the plurality of discrete write requests; and
executing the plurality of discrete write requests on the second computing device.

18. The computing system of claim 15 wherein combining the plurality of discrete write requests into a consolidated write request includes:
confirming that the quantity of discrete write requests included in the plurality of discrete write requests does not exceed a discrete write request quantity limit.

19. The computing system of claim 18 wherein monitoring the total number of write requests received on the first computing device during an extended sampling window includes determining an average write request statistic.

20. The computing system of claim 19 further comprising:
adjusting the discrete write request quantity limit based, at least in part, upon the average write request statistic.

21. The computer-implemented method of claim 15 wherein combining the plurality of discrete write requests into a consolidated write request includes:
confirming that the size of the consolidated write request does not exceed a consolidated write request size limit.

* * * * *